United States Patent [19]

Sato et al.

[11] Patent Number: 4,957,343
[45] Date of Patent: Sep. 18, 1990

[54] METHOD FOR SPLICING OPTICAL FIBERS HAVING A PLASTIC CLAD LAYER AND AN OPTICAL FIBER SUITED FOR CARRYING OUT THE METHOD

[75] Inventors: Tsuguo Sato; Kenichi Komura, both of Tokyo, Japan

[73] Assignee: The Furukawa Electric Co., Ltd., Tokyo, Japan

[21] Appl. No.: 428,880

[22] Filed: Oct. 30, 1989

[51] Int. Cl.$^5$ .................... G02B 6/38; G02B 6/02
[52] U.S. Cl. ................... 350/96.21; 350/96.29; 350/96.34
[58] Field of Search ............. 350/96.10, 96.15, 96.20, 350/96.21, 96.29, 96.30, 96.31, 96.32, 96.33, 96.34, 320; 219/121.11, 121.17

[56] References Cited

U.S. PATENT DOCUMENTS 4,778,245 10/1988 Ueno et al. .................. 350/96.23

FOREIGN PATENT DOCUMENTS 0185190 1/1989 Japan .

Primary Examiner—Akm Ullah
Attorney, Agent, or Firm—Frishauf, Holtz, Goodman & Woodward

[57] ABSTRACT

A method for splicing optical fibers is provided which is applied to an optical fiber using, as the material of a clad layer, hexafluoroalkyl methacrylate, a residuum of which after pryolysis due to a thermogravimetric analysis is 10% or less by weight. The method comprises a step of removing a protective layer and a cushioning layer at an end portion of the optical fiber, to expose the clad layer, a step of positioning two optical fibers, the end portions of which have been treated, such that the end faces of cores of the two optical fibers are opposed and close to each other, and a step of heating the end portions of the two optical fibers by electrical discharge, to remove the exposed clad layer by pyrolysis and fusion bond the opposed end faces of the cores to each other.

18 Claims, 3 Drawing Sheets

METHOD FOR SPLICING OPTICAL FIBERS HAVING A PLASTIC CLAD LAYER AND AN OPTICAL FIBER SUITED FOR CARRYING OUT THE METHOD

BACKGROUND OF THE INVENTION

This invention relates to a method for splicing optical fibers with each other, more particularly, a method for joining together optical fibers having a core coated with a plastic clad layer, by fusing the core, and to an optical fiber suited for carrying out the method.

Among various types of optical fibers, there are ones having a clad layer made of a plastic material. This type of optical fibers has a structure such that a plastic clad layer, a cushioning layer, and a protective layer are coated in sequence around the core. To join optical fibers of this type with each other, an optical connector is used to detachably connect the fibers, or the cores of the fibers are directly spliced with each other.

The method using an optical connector, however, has the problem that peeling of the connecting portions of optical fibers occurs due to a difference in the coefficient of thermal expansion between the core and the above-mentioned layers, as is evidenced by a heat cycle test carried out with a temperature range of $-20°$ C. to $60°$ C., for example. Accordingly, when high reliability of connection between optical fibers and miniaturization of the connecting potion are required, for example, when optical fibers arranged outdoors need to be connected to ones arranged indoors, a method of joining optical fibers by fusing the cores, namely, a fusion bonding method, is employed.

According to the fusion bonding method, to expose the core of an optical fiber, the protective layer, the cushioning layer and the clad layer must be removed, but since the clad layer, in particular, firmly adheres to the core, every caution must be taken when removing the clad layer. When a hand tool such as a knife is used to remove the clad layer, the surface of the core may be damaged by chance, causing a problem in that the splice loss is increased and the strength is decreased at the connected portion. Therefore, instead of using a hand tool to remove the clad layer, other methods are employed, considering that the clad layer is made of a plastic material, in general, a silicone resin; for example, a method of dissolving the clad layer in a solvent, a method of causing an organic solvent, such as benzene, or a strong acid, such as concentrated sulfuric acid, to penetrate through the clad layer to swell the same and removing the swollen clad layer, and a method of removing the clad layer after the layer is deteriorated by heat. These methods of removing the clad layer without the use of a hand tool, however, have the following disadvantages. Namely, for optical fibers which have already been installed, there is no solvent suited for removing the clad layer of the laid optical fibers. Therefore, the connecting operation cannot be carried out safely and easily and the disposal of the used solvent calls for the greatest care in view of environmental preservation. In the case of deteriorating the clad layer by heat, the clad layer is heated by a gas burner, for example, but this operation involves danger and the core itself can be made very brittle due to heat.

OBJECTS AND SUMMARY OF THE INVENTION

A first object of the present invention is to provide a method for splicing optical fibers with reliability and ease, and a second object thereof is to provide an optical fiber suited for carrying out the method.

The first object is achieved by a splicing method of the present invention, which method comprises the steps of: preparing an optical fiber having a clad layer and a sheath coated in sequence around a core thereof, the clad layer being made of such a resin that a residuum thereof after pyrolysis due to a thermogravimetric analysis is smaller than a predetermined amount; removing the sheath at an end portion of the optical fiber, to expose the clad layer, and treating the end face of the core at the end portion of the optical fiber; aligning axes of two optical fibers, end portions of which have been treated in the previous step, such that the treated end faces of the cores of the two optical fibers are opposed and close to each other; and heating the end portions of the two optical fibers by electrical discharge, to remove the exposed clad layer by pyrolysis and fusion bond the opposed end faces of the cores to each other.

According to the method of the invention, the cores of optical fibers to be spliced can be subjected to the heating process with the clad layer coated thereon, to be fusion bonded to each other by electrical discharge. In the fusion bonding, the clad layer is removed by pyrolysis. Since the clad layer is made of the aforesaid resin and thus the residuum thereof after the pyrolysis is below the predetermined amount, a splice loss due to the residuum is lowered and a reliable connection of optical fibers is ensured.

The clad layer need not be removed, as mentioned above, and accordingly, optical fibers can be spliced by a simple procedure and with ease and the cost of splice is reduced. Moreover, since the optical fibers are heated by electrical discharge, the fibers are by no means deteriorated and the splicing operation can be performed safely. Also, as no solvent is used, the problem of disposal of the used solvent does not arise.

The second object of the invention is achieved by an optical fiber comprising: a core of continuous length; a clad layer coated over an entire periphery of the core, the clad layer being made of such a resin that a residuum thereof after pyrolysis due to a thermogravimetric analysis is smaller than a predetermined amount; and a sheath coated over an entire periphery of the clad layer.

The optical fiber according to the invention has a clad layer made of the aforesaid resin and accordingly is suited for carrying out the aforementioned method.

DETAILED DESCRIPTION

Figure 1:
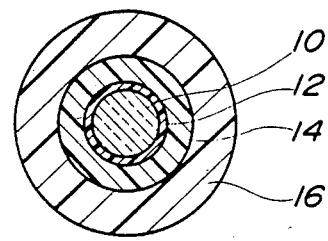
FIG. 1 is a transverse sectional view of an optical fiber according to one embodiment of the invention.

An optical fiber shown in FIG. 1 has a core 10 of continuous length at the center thereof, which core is made of transparent quartz glass or optical glass. A clad layer 12, which is made of one of various plastic materials having an index of refraction smaller than that of the material of the core 10, is coated over the entire periphery of the core 10. As the material for the clad layer 12, a silicone resin or a fluorine-containing resin is used because of excellent light transmission property and large numerical aperture.

A cushioning layer 14 and a protective layer 16 are coated in sequence around the clad layer 12. The cushioning layer 14 serves to mitigate a stress applied to the optical fiber from outside, and is made of, e.g., a silicone resin, polyurethane resin, or acrylic resin. The protective layer 16 is made of a thermoplastic resin such as nylon, polyethylene, etc.

Figure 2:
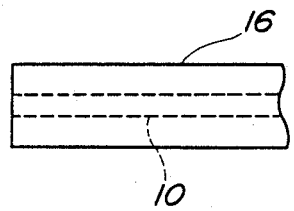
FIGS. 2 through 6 are diagrams showing a process of splicing optical fibers of FIG. 1.
Figure 3:
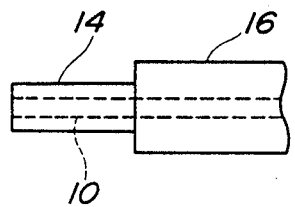
Figure 4:
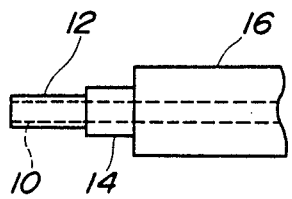
Figure 5:
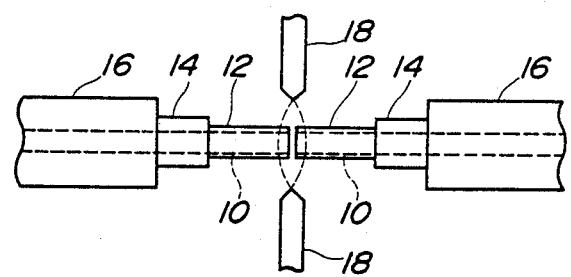
Figure 6:
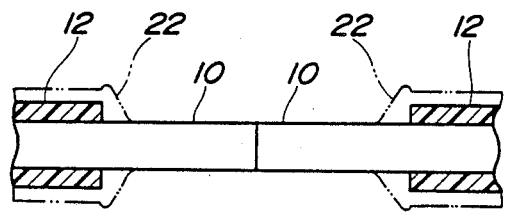

FIGS. 2 to 6 illustrate in sequence a process of splicing the optical fibers described above. FIG. 2 shows a cut end portion of an optical fiber to be spliced. A physical or chemical treatment is applied to the end portion of the fiber, to sequentially remove the protective layer 16 and the cushioning layer 14, as shown in FIGS. 3 and 4, so that the clad layer 12 is exposed at the fiber end portion. Subsequently, the end of the optical fiber to be spliced, i.e., the end of the core 10 around which the clad layer 12 is still present, is cut to form a specular surface or the end face of the core 10 is specularly polished, thereby finishing the fiber end treatment. Two optical fibers whose end portions have been treated in the aforesaid manner are positioned by using a fixing device, not shown, such that the end faces to be spliced are located close to each other and the axes of the two fibers are in alignment, as shown in FIG. 5. With the fibers held in this state, an arc flame 20 is produced by arc discharge between a pair of electrodes 18 between which the fiber ends are located. The arc flame has a high temperature of 1800° C. or more, whereby the end portions of the cores 10 to be spliced are heated together with the exposed clad layers 12. Thus, the clad layers 12 are removed from the cores 10 due to pyrolysis, as shown in FIG. 6, and the cores 10 are locally fused and instantaneously bonded to each other simultaneously with or after the removal of the clad layers 12. Thereafter, although not shown, a resin having a refractive index smaller than that of the core 10 is applied to the spliced portion of the optical fibers, i.e., the exposed portion of the cores 10, and a heat-shrinkable tube is covered over the spliced portion with a reinforcing material therebetween, thereby finishing the splicing of optical fibers.

According to the above-described splicing method of the invention, it is necessary that the clad layers 12 are removed by pyrolysis effected by an arc flame, and accordingly, to satisfactorily carry out the method, the material of the clad layer 12 need be selected from suitable materials. Thus, materials suited for the clad layer 12 will now be described.

Plastic materials usable for the clad layer 12 include silicone resins and fluorine-containing resins, and among these, silicone resins are most generally used. However, silicone resins produce oxide flakes, i.e., silicon dioxide ($SiO_2$) flakes, when heated and pyrolytically decomposed. If the flakes adhere to the surface of the core 10 or are fusion bonded thereto, light transmitted through the core 10 is scattered by the flakes. Accordingly, the method of the invention is not suitable for optical fibers whose clad layer 12 is made of a silicone resin.

Among fluorine-containing resins as the plastic material for the clad layer 12, those having a refractive index smaller than that of the material of the core, for example, quartz glass, will now be considered. A fluoropolysiloxane resin disclosed in Japanese Patent Disclosure No. 62-7006, which is one of such resins, has a molecular structure containing silicon, and accordingly, when pyrolytically decomposed, a residuum of silicon dioxide is produced as in the case of silicone resins. Therefore, the method of the invention is not suitable for optical fibers whose clad layer 12 is made of a fluoropolysiloxane resin.

Figure 7:
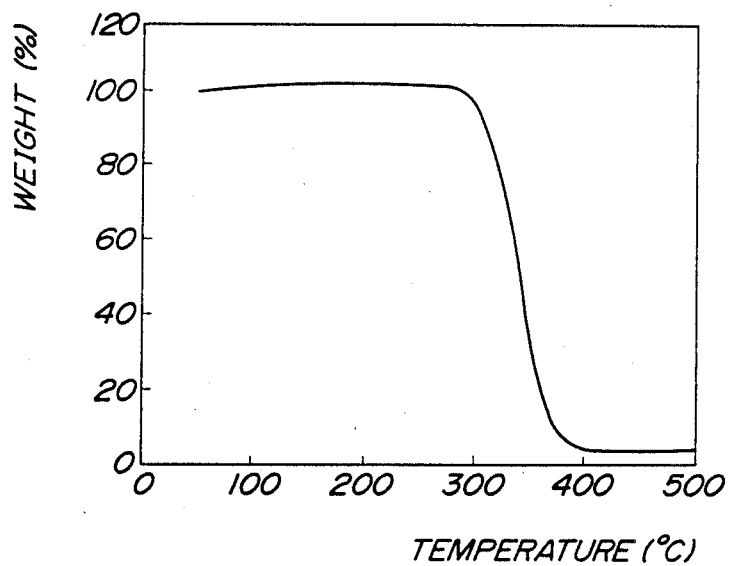
FIG. 7 is a chart showing a result of a thermogravimetric analysis of hexafluoroalkyl methacrylate.

The inventors of the present invention noted fluorine-containing (meth)acrylate, for example, hexafluoroalkyl methacrylate, among fluorine-containing resins, and carried out a thermogravimetric analysis of this resin, the result of which is shown in FIG. 7. In the thermogravimetric analysis, 4.7 mg hexafluoroalkyl methacrylate was heated such that the temperature thereof was increased at a rate of 10° C. per minute. As a result, pyrolytic reaction of the resin appeared at about 270° C., which was rapidly advanced with an increase in temperature and ended at about 360° C., as shown in FIG. 7. More than 97% of the resin, by weight, was lost in the thermogravimetric analysis. Namely, a hexafluoroalkyl methacrylate resin has the property of being decomposed by heat into gases of $H_2O$, $CO$, $CO_2$, $CF_4$, etc. and producing almost no residuum of carbon oxide such as soot. In view of this, the inventors further studied resins having such property, which are suited for the material of the clad layer 12 of optical fibers, and found that resins of which the residuum after pyrolysis is 10% or less, preferably 3% or less, were suitable for carrying out the method of the invention.

Apart from the material of the clad layer 12 described above, now, the thickness of the clad layer 12 will be considered. When optical fibers are fusion bonded to each other, the discharge time for producing an arc flame 20 between the electrodes 18 is usually set to be as short as several to 10 seconds, and when the end portions of the optical fibers to be spliced are heated by the arc flame 20, the temperature distribution of the end portion of one optical fiber is such that the temperature becomes lower with distance from the other optical fiber. Therefore, if the thickness of the clad layer 12 is large as indicated by the one-dot chain line in FIG. 6, the amount of resin to be pyrolyzed is also large, and accordingly, a carbon oxide residuum 22 can be produced at the interface between pyrolyzed and unpyrolyzed regions of the clad layer 12, as shown in FIG. 6. The residuum 22 scatters light transmitted through the core 10 of the optical fiber, and such scattering is a major cause of the splice loss. Therefore, when carrying out the method of the invention, the thickness of the clad layer 12 of optical fibers must be limited to below a predetermined value. According to the inventors' studies of the thickness of the clad layer 12, the method of the invention can be satisfactorily carried out when the thickness of the clad layer 12 is 30 μm or less.

As seen from the above, the method of splicing optical fibers, according to the invention, is suitably applied to such optical fibers that the clad layer 12 thereof is made of a fluorine-containing resin, which has a refractive index smaller than that of the material of the core 10 and the residuum of which, when subjected to thermogravimetric analysis, is smaller than the predetermined amount, and has a thickness smaller than the predetermined value.

Now, optical fibers used for the method of the invention and examples of carrying out the method will be described.

EXAMPLE 1

An optical fiber used was composed of a core 10 obtained by subjecting a quartz rod to wire drawing and having an outer diameter of 200 μm, a clad layer 12 of hexafluoroalkyl methacrylate, coated on the core 10 and having a thickness of 20 to 30 μm, a cushioning layer 14 of silicone resin, coated on the clad layer 12 and having a thickness of 40 to 80 μm, and a protective layer 16 made of a thermoplastic resin such as nylon, polyethylene, ethylene tetrafluoride-ethylene copolymer, etc. and coated on the cushioning layer 14. The optical fiber had an outer diameter of 0.9 mm.

To splice optical fibers constructed as above, two optical fibers of 200m and 300m long, respectively, were prepared, and the protective layer 16 and the cushioning layer 14 at one end portion of each of the optical fibers were removed by using a wire stripper, whereby the clad layer 12 at the end portion of each fiber was exposed. Thereafter, the end portion of each optical fiber was cut at a predetermined position by a fiber cutter, thereby forming a specular end face. The two optical fibers, the end portions of which had been treated in the above manner but still had the clad layer 12 coated thereon, were placed such that the finished end faces were located close to each other and the axes of the fibers were in alignment. Then, an arc flame was produced, namely, arc discharge was effected, between the electrodes 18 for 8 seconds, to fusion bond the optical fibers to each other.

By using the above-described splicing method, ten optical fibers, each 500 m long, were produced, and the splice loss of these fibers was measured using light with a wavelength of 0.85 μm. Those optical fibers whose core 10 was exposed or air-clad at the spliced portion had a very small splice loss of about 0.06 dB on an average. On the other hand, those optical fibers, the exposed core 10 of which was applied with a resin to form a new clad layer and which were subjected to a process for practical application, such as reinforcement, to increase the strength after the splicing, had a splice loss of about 0.2 dB on an average. Thus, according to the splicing method of the present invention, the splice loss at the connected portion of optical fibers can be restricted to a small value, and accordingly, optical fibers spliced by the method of the invention are fully practical.

EXAMPLE 2

Except that the clad layer 12 was made of polyfluorovinylidene, and not hexafluoroalkyl methacrylate, optical fibers prepared in Example 2 were identical with those used in Example 1, in respect of the structure of fibers and the procedure of splicing. Those optical fibers of Example 2 whose core was exposed or air-clad at the spliced portion had a splice loss of 0.07 dB on an the average, and those optical fibers on which the aforesaid process for practical application was performed had a splice loss of 0.3 dB on an average. The residuum produced by the pyrolysis of polyfluorovinylidene was 8% by weight.

EXAMPLE 3

Figure 8:
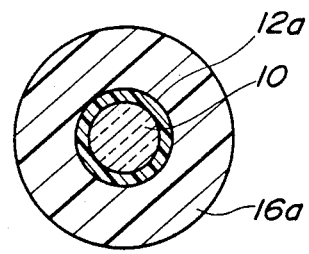
FIG. 8 is a transverse sectional view of an optical fiber according to another embodiment of the invention.

Example 3 will be described with reference to FIG. 8. In optical fibers of Example 3, a clad layer 12a was made of fluorine-containing methacrylate, and a protective layer 16a of ethylene tetrafluoride-ethylene copolymer was directly coated on the clad layer 12a. The outer diameter of the protective layer 16a was 0.5 mm. Except for these, the optical fibers prepared in Example 3 were identical in structure with those used in the above examples. The splicing method of the present invention was applied to the optical fibers of Example 3, and those optical fibers whose core was exposed or air-clad at the spliced portion had a splice loss of 0.05 dB on an average, on the other hand, those optical fibers on which a process for practical application was performed, namely, a protective layer 16a was coated on the spliced portion, had a splice loss of 0.2 dB on an average. The residuum produced by the pyrolysis of the resin used for the clad layer 12a was 4% by weight.

What is claimed is:

1. A method for splicing optical fibers having a clad layer made of a plastic material, comprising the steps of:
   (a) preparing an optical fiber having a clad layer and a sheath coated in sequence around a core thereof, said clad layer being made of such a resin that a residuum thereof after pyrolysis due to a thermogravimetric analysis is smaller than a predetermined amount;
   (b) removing the sheath at an end portion of the optical fiber, to expose the clad layer, and treating the end face of the core at the end portion of the optical fiber;
   (c) aligning axes of two optical fibers, end portions of which have been treated in said step (b), such that the treated end faces of the cores of the two optical fibers are opposed and close to each other; and
   (d) heating said end portions of the two optical fibers by electrical discharge, to remove the exposed clad layer by pyrolysis and fusion bond the opposed end faces of the cores to each other.

2. The method according to claim 1, wherein, in said step (d), the removal of the clad layer by pyrolysis and the fusion bonding of the end faces of the cores are carried out simultaneously.

3. The method according to claim 1, wherein, in said step (d), the fusion bonding of the end faces of the cores is carried out after the clad layer is removed by pyrolysis.

4. The method according to claim 1, wherein said clad layer is made of a resin containing fluorine and having a smaller refractive index than a material of which said core is made.

5. The method according to claim 4, wherein said clad layer is made of such a resin selected from among fluorine-containing resins that a residuum thereof after pyrolysis due to a thermogravimetric analysis is 10% or less by weight.

6. The method according to claim 5, wherein said clad layer is made of such a resin that a residuum thereof after the pyrolysis contains no silicon oxide.

7. The method according to claim 6, wherein said resin comprises one of fluorine-containing (meth)acrylate and polyfluorovinylidene.

8. The method according to claim 4, wherein said clad layer has a thickness of not greater than 30 μm.

9. An optical fiber having a clad layer of plastic material and suited to be spliced with another optical fiber by fusion bonding, comprising:
   a core of continuous length;
   a clad layer coated over an entire periphery of the core, said clad layer being made of such a resin that a residuum thereof after pyrolysis due to a thermogravimetric analysis is smaller than a predetermined amount; and a sheath coated over an entire periphery of the clad layer.

10. The optical fiber according to claim 9, wherein said clad layer is made of a resin containing fluorine and having a smaller refractive index than a material of which said core is made.

11. The optical fiber according to claim 10, wherein said clad layer is made of such a resin selected from among fluorine-containing resins that a residuum thereof after pyrolysis due to a thermogravimetric analysis is 10% or less by weight.

12. The optical fiber according to claim 11, wherein said clad layer is made of such a resin that a residuum thereof after the pyrolysis contains no silicon oxide.

13. The optical fiber according to claim 12, wherein said resin comprises one of fluorine-containing (meth)acrylate and polyfluorovinylidene.

14. The optical fiber according to claim 9, wherein said clad layer has a thickness of not greater than 30 μm.

15. The optical fiber according to claim 9, wherein said sheath includes a protective layer coated on said clad layer.

16. The optical fiber according to claim 15, wherein said protective layer is made of a thermoplastic resin selected from nylon, polyethylene, and ethylene tetrafluoride-ethylene copolymer (ETFE).

17. The optical fiber according to claim 9, wherein said sheath includes a cushioning layer coated on said clad layer, and a protective layer coated on said cushioning layer.

18. The optical fiber according to claim 17, wherein said cushioning layer is made of a silicone resin, and said protective layer is made of a thermoplastic resin selected from nylon, polyethylene, and ethylene tetrafluoride-ethylene copolymer (ETFE).

* * * * *